(12) United States Patent
Moritomi

(10) Patent No.: US 6,322,882 B1
(45) Date of Patent: Nov. 27, 2001

(54) POLYPHENYLENE ETHER RESIN COMPOSITION

(75) Inventor: Satoru Moritomi, Sodegaura (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 09/416,268

(22) Filed: Oct. 12, 1999

(30) Foreign Application Priority Data

Oct. 14, 1998 (JP) .................................................. 10-291969

(51) Int. Cl.[7] .............................. C08K 3/36; C08K 5/521; C08L 71/12
(52) U.S. Cl. ...................... 428/220; 524/127; 524/140; 524/141; 524/267; 525/393; 525/397
(58) Field of Search ..................................... 524/127, 141, 524/267, 140; 525/393, 397; 428/220

(56) References Cited

U.S. PATENT DOCUMENTS

| | | | |
|---|---|---|---|
| 3,960,985 | * | 6/1976 | Cooper . |
| 4,107,232 | | 8/1978 | Haaf et al. . |
| 4,282,139 | * | 8/1981 | Sugio . |
| 4,332,714 | | 6/1982 | Haaf et al. . |
| 4,355,126 | | 10/1982 | Haaf et al. . |
| 4,749,737 | * | 6/1988 | van der Meer . |
| 5,006,403 | * | 4/1991 | Isayev . |
| 5,169,887 | | 12/1992 | Snow et al. . |
| 5,206,276 | | 4/1993 | Lee, Jr. . |
| 5,294,655 | | 3/1994 | Lee, Jr. et al. . |

FOREIGN PATENT DOCUMENTS

| | | |
|---|---|---|
| 0829521A1 | 3/1989 | (EP) . |
| 0767204A2 | 4/1997 | (EP) . |
| 2294934A | 5/1996 | (GB) . |
| 57-207641A | 12/1982 | (JP) . |
| 57-207642 | 12/1982 | (JP) . |
| 59-202240A | 11/1984 | (JP) . |
| 157898 | * 6/1994 | (JP) . |
| 329898 | * 11/1994 | (JP) . |

* cited by examiner

Primary Examiner—David J. Buttner
(74) Attorney, Agent, or Firm—Birch, Stewart, Kolasch & Birch LLP

(57) ABSTRACT

There is provided a polyphenylene ether resin composition comprising:

(i) a polyphenylene ether resin;
(ii) a phosphoric ester; and
(iii) a dispersed substance having an aspect ratio of not less than about 2, and which composition has superior heat resistance and flame resistance without use of any halogen-containing flame retardant or any halogen-containing anti-dripping agent as an essential or mandatory component.

5 Claims, No Drawings

POLYPHENYLENE ETHER RESIN COMPOSITION

FIELD OF THE INVENTION

The present invention relates to a polyphenylene ether resin composition. More specifically, the present invention relates to a polyphenylene ether resin composition having superior heat resistance and flame resistance. The polyphenylene ether resin composition of the present invention can be used particularly suitably as a flame-resisting insulation sheet for electric and electronic parts without use of any halogen-containing flame retardant or any halogen-containing anti-dripping agent as an essential component.

BACKGROUND OF THE INVENTION

A flame-resisting insulation sheet has a thickness of from about 0.1 to 0.5 mm and is required to have superior heat resistance as well as superior flame-resisting and insulation properties. As such a flame-resisting insulation sheet, a polyvinyl chloride resin-made sheet has been used extensively. However, a flame-resisting insulation sheet comprising no halogen has been increasingly required, because of an environmental problem due to the influence of halogen contained in the resin. In addition, a thin sheet such as a flame-resisting insulation sheet, when burned, easily causes an undesirable phenomenon such that a kindling piece of the sheet drips, the phenomenon being hereinafter referred to as "dripping phenomenon". In this regard, a halogen-free sheet causes the dripping phenomenon more easily than a halogen-containing sheet.

As a technique to improve the dripping phenomenon of a polyphenylene ether resin, for example, U.S. Pat. Nos. 4,107,232, 4,332,714 and 4,355,126 disclose a combination use of polyfluoroethylene. Each of the references referred to above is incorporated herein by reference in its entirety.

However, there is left an environmental problem, because polyfluoroethylene also contains a halogen (fluorine) like a polyvinyl chloride resin.

SUMMARY OF THE INVENTION

Accordingly, an object of the present invention is to provide a polyphenylene ether resin composition having superior heat resistance and flame resistance, which composition comprises neither a halogen-containing flame retardant nor a halogen-containing anti-dripping agent as an essential or mandatory component.

The present inventors have undertaken extensive studies relating to both the heat-resisting and flame-resisting properties of polyphenylene ether resin compositions. As a result, it has been found that a resin composition comprising a polyphenylene ether resin, a phosphoric ester and dispersed substances having a specific size can meet said object, and thereby the present invention has been obtained.

The present invention provides a polyphenylene ether resin composition comprising:

(i) a polyphenylene ether resin;
(ii) a phosphoric ester; and
(iii) a dispersed substance having an aspect ratio of not less than about 2.

The present invention also provides a flame-resisting insulation sheet containing the above-mentioned polyphenylene ether resin composition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The term "polyphenylene ether resin" used in the present invention means a homopolymer resin or a copolymer resin obtained by oxidation polymerizing at least one phenol compound represented by the following formula (I) with oxygen or an oxygen-containing gas with the aid of an oxydative coupling catalyst,

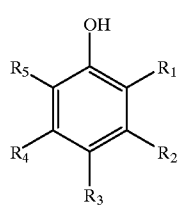

(I)

wherein $R_1$, $R_2$, $R_3$, $R_4$ and $R_5$ are independently of one another a hydrogen atom, a halogen atom, a hydrocarbon group or a substituted hydrocarbon group, provided that one of them is always a hydrogen atom.

Examples of $R_1$, $R_2$, $R_3$, $R_4$ and $R_5$ in the formula (I) are hydrogen, chlorine, bromine, fluorine, iodine, methyl, ethyl, n- or iso-propyl, pri-, sec- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the phenol compound represented by the formula (I) are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. Among these phenol compounds, 2,6-dimethylphenol, 2,6-diphenylphenol, 3-methyl-6-t-butylphenol and 2,3,6-trimethylphenol are preferred.

The phenol compound represented by the formula (I) may be copolymerized with a polyhydric aromatic compound such as bisphenol-A, tetrabromobisphenol-A, resorcinol, hydroquinone and novolak resins to prepare a copolymer. In the present invention, the copolymer is also contained in the polyphenylene ether resin according to the present invention.

The oxidative coupling catalyst used for the oxidative (co)polymerization of said phenol compound is not particularly limited, and any catalyst having a polymerizing ability can be used. As a process for oxidatively (co)polymerizing the phenol compound to produce the polyphenylene ether resin, there are exemplified those disclosed in, for example, U.S. Pat. Nos. 3,306,874, 3,306,875 and 3,257,357, Japanese Patent Publication (JP-B) No. 52-17880, and Japanese Patent Application Kokai (JP-A) Nos. 50-51197 and 1-304119. Each of the references referred to above is incorporated herein by reference in its entirety.

Specific examples of the polyphenylene ether resin used in the present invention are poly(2,6-dimethyl-1,4- phenylene ether), poly(2,6-diethyl-1,4-phenylene ether), poly(2-methyl-6-ethyl-1,4-phenylene ether), poly(2-methyl-6-propyl-1, 4-phenylene ether), poly(2, 6-dipropyl-1, 4-phenylene ether), poly(2-ethyl-6-propyl-1,4-phenylene ether), poly(2,6-dibutyl-1,4-phenylene ether), poly(2,6-dipropenyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1, 4-phenylene ether), poly(2-ethyl- 6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(3-methyl-6-t-butyl-1,4-phenylene ether), poly(2,6-dibenzyl-1,4-phenylene ether) and copolymers of every description containing a number of the repeating units constituting the above-exemplified resins.

Further, a copolymer of a multi-substituted phenol such as 2,3, 6-trimethylphenol and 2,3,5, 6-tetramethylphenol with a 2-substituted phenol such as 2,6-dimethylphenol is also contained in the polyphenylene ether resin according to the present invention.

Among the polyphenylene ether resins exemplified above, preferred are poly(2,6-dimethyl-1,4-phenylene ether) and a copolymer of 2,6-dimethylphenol with 2,3,6-trimethylphenol.

The polyphenylene ether resin used in the present invention may be a graft copolymer obtained by grafting the above-mentioned (co)polymer with a styrene compound such as styrene, α-methylstyrene, p-methylstyrene and vinyltoluene, and such a graft copolymer is also contained in the polyphenylene ether resin according to the present invention.

With respect to the polyphenylene ether resin used in the present invention, those having an intrinsic viscosity of from about 0.3 to 0.7 dl/g, preferably from about 0.36 to 0.65 dl/g, more preferably from about 0.40 to 0.6 dl/g, measured in chloroform at 30° C. are preferred. When the intrinsic viscosity is too low, it may be difficult to attain no-dripping (i.e. to cause no dipping phenomenon) at the time of combustion, and when it is too high, the polyphenylene ether resin composition in accordance with the present invention may be deteriorated in its molding processability. Here, the term "no-dripping" means that a sample in the course of burning is not observed to drip in a flame resistance test, that is, a UL 94 vertical combustion test.

The term "phosphoric ester" used in the present invention means a compound represented by the following formula (II),

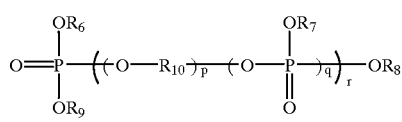

(II)

wherein $R_6$, $R_7$, $R_8$ and $R_9$ are independently of one another a hydrogen atom or an organic group having 1 to 20 carbon atoms, provided that the case where all of $R_6$, $R_7$, $R_8$ and $R_9$ are hydrogen atoms at the same time is excluded, $R_{10}$ is a divalent organic group having 1 to 20 carbon atoms, p is 0 or 1, q is an integer of not less than 1, and r is an integer of not less than 0.

Examples of the organic group represented by $R_6$, $R_7$, $R_8$ and $R_9$ are an alkyl group having 1 to 20 carbon atoms, a cycloalkyl group having 3 to 20 carbon atoms, an aryl group having 6 to 20 carbon atoms and an alkoxy group having 1 to 20 carbon atoms. These groups may be substituted with any substituent. Examples of the substituent are an alkyl group, an alkoxy group, an alkylthio group, an aryl group, an aryloxy group, an arylthio group and a hydroxyl group. Further, as the substituent, a group formed by combining the groups exemplified above such as, for example, an arylalkoxyalkyl group, and a group formed by bonding the groups exemplified above through an atom such as, for example, an oxygen, sulfur or nitrogen atom, such as, for example, an arylsulfonylaryl group, are also enumerated.

Specific examples of $R_6$, $R_7$, $R_8$ and $R_9$ are methyl, ethyl, propyl, butyl, pentyl, octyl, dodecyl, ethylhexyl, trimethylhexyl, cyclopropyl, cyclopentyl, cyclohexyl, phenyl, tolyl, xylyl, nonylphenyl, naphthyl and butoxyethyl groups. Of these, phenyl, tolyl and xylyl groups are preferred.

As the $R_{10}$ group, an alkylene group derived from an alkyl group having 1 to 20 carbon atoms; a phenylene group derived from a substituted or unsubstituted phenyl group; and a group derived from a polynuclear phenol such as bisphenols are exemplified. Of these, the latter two groups are preferred. As a particularly preferred $R_{10}$ group, divalent groups derived from hydroquinone, resorcinol and bisphenol-A are exemplified respectively.

Specific examples of the phosphoric ester are trimethyl phosphate, triethyl phosphate, tributyl phosphate, trioctyl phosphate, tributoxyethyl phosphate, phenyl bisdodecyl phosphate, pheny bisneopentyl phosphate, phenyl bis(3,5,5-trimethylhexyl) phosphate, ethyl dipheny phosphate, bis(2-ethylhexyl) (p-tolyl) phosphate, tritolyl phosphate, bis(2-ethylhexyl) phenyl phosphate, tri(nonylphenyl) phosphate, triphenyl phosphate, dibutyl phenyl phosphate, p-tolyl bis (2,5,5-trimethylhexyl) phosphate, 2-ethylhexyl diphenyl phosphate, bisphenol-A bisdiphenyl phosphate, bisphenol-A bisdicresyl phosphate, bisphenol-A bisdixylyl phosphate, hydroquinone bisdiphenyl phosphate, hydroquinone bisdicresyl phosphate, hydroquinone bisdixylyl phosphate, resorcinol bisdiphenyl phosphate, resorcinol bisdicresyl phosphate, and resorcinol bisdixylyl phosphate.

Two or more kinds of the phosphoric ester may be used at the same time. In such a case, from a view point of balance between the heat-resisting and flame-resisting properties of the polyphenylene ether resin composition obtained, it is recommendable to use a combination of a non-condensation type phosphoric ester having 0 (zero) as r in the formula (II) with a condensation type phosphoric ester having an integer of not less than 1 as r in the formula (II). As the non-condensation type phosphoric ester (r=0), tritolyl phosphate and triphenyl phosphate are preferred, and as the condensation type phosphoric ester (r≧1), bisphenol-A bisdiphenyl phosphate, bisphenol-A bisdixylyl phosphate, resolcinol bisdiphenyl phosphate and resorcinol bisdixylyl phosphate are preferred.

A content of the phosphoric ester in the polyphenylene ether resin composition in accordance with the present invention is preferably from about 1 to 70 parts by weight, more preferably from about 2 to 65% by weight, based on 100 parts by weight of the polyphenylene ether resin. When the content of the phosphoric ester is too small, the flame-resisting property of the polyphenylene ether resin composition obtained may be insufficient, whereas, when it is too large, the heat-resisting property thereof may be insufficient.

The term "dispersed substance" used in the present invention means a component incompatible (i.e. not capable of being mixed homogeneously) with either the polyphenylene ether resin or the phosphoric ester. Said component forms a dispersed phase, which is dispersed in a continuous phase (matrix) comprising the polyphenylene ether resin and the phosphoric ester. Examples of the dispersed substance are an inorganic filler, a liquid crystal polymer and a polyorganosiloxane.

Examples of the inorganic filler are calcium silicate, magnesium silicate, reinforcing fibers such as glass fiber, carbon fiber, aramid fiber and fibers made of aluminum or stainless steel, metal whisker, silica, alumina, calcium carbonate, wollastonite, talc, mica, clay and kaolin.

The term "liquid crystal polymer" means a polymer exhibiting a property of liquid crystal when melted. Said polymer is characterized in that (i) it has a higher heat deformation temperature than that of the continuous phase (matrix)-forming components in the polyphenylene ether resin composition of the present invention and (ii) it is oriented easily in a fibril form in the matrix.

As the liquid crystal polymer, there are enumerated thermoplastic liquid crystal polyesters such as, for example, VECTRA A950 (trademark) produced by Polyplastics co. Ltd , EKONOL 6000 (trademark) produced by Sumitomo Chemical Co., XYDAR (trademark) produced by Nippon Petrochemicals Co., and RODRUN LC3000 and LC5000 (trademarks) produced by Unitika Ltd.

The term "polyorganosiloxane" means a compound comprising at least one structure unit selected from those represented by the following formulas (III), (IV) and (V) and a structure unit represented by the following formula (VI),

$$SiO_{2.0} \quad (III)$$
$$R_{11}SiO_{1.5} \quad (IV)$$
$$R_{12}R_{13}SiO_{1.0} \quad (V)$$
$$R_{14}R_{15}R_{16}SiO_{1.5} \quad (VI)$$

wherein $R_{11}$, $R_{12}$ and $R_{13}$ are independently of one another an alkyl group having 1 to 3 carbon atoms or an aryl group having 6 to 10 carbon atoms, and $R_{14}$, $R_{15}$ and $R_{16}$ are independently of one another an alkyl group having 1 to 6 carbon atoms, an aryl group having 6 to 12 carbon atoms, an alkoxy group having 1 to 6 carbon atoms or a hydroxyl group.

Here, the formula (III) stands for a tetravalent structure unit expressing non-terminal parts of the polyorganosiloxane molecule, the formula (IV) stands for a trivalent structure unit expressing non-terminal parts of said molecule, the formula (V) stands for a divalent structure unit expressing non-terminal parts of said molecule, and the formula (VI) stands for a monovalent structure unit expressing terminal parts of said molecule. Therefore, a polyorganosiloxane comprising both the structure unit of the formula (V) and that of the formula (VI) results in a straight chain structure, while, a polyorganosiloxane comprising the structure unit of either the formula (III) or (IV) results in a branched structure and/or a network (cross-linked) structure.

With respect to $R_{11}$, $R_{12}$ and $R_{13}$ in the formulas (IV) and (V), a preferred alkyl group is a methyl group and a preferred aryl group is a phenyl group. With respect to $R_{14}$, $R_{15}$ and $R_{16}$ in the formula (VI), a preferred alkyl group is a methyl group, a preferred aryl group is a phenyl group and a preferred alkoxy group is a methoxy group.

Specific examples of the polyorganosiloxane are a straight chain polydimethylsiloxane comprising structure units of the formulas (V) and (VI); a polydiorganosiloxane formed by replacing a part of the methyl groups in the above polydimethylsiloxane with a phenyl group; a branched structure polymethylsiloxane comprising structure units of the formulas (IV), (V) and (VI); and a polyorganosiloxane formed by replacing a part of the methyl groups in the above polymethylsiloxane with a phenyl group. In case of a polyorganosiloxane having phenyl groups as $R_{11}$, $R_{12}$ or $R_{13}$, a preferred phenyl group content is from about 30 to 70 mole % based on the sum of $R_{11}$, $R_{12}$ and $R_{13}$.

The polyorganosiloxane may be used in combination with silica. A preferred combination is a powdery mixture of a polydiorganosiloxane and silica. As the polydiorganosiloxane used in combination with silica, preferred is that having a viscosity of from about 10 to 100000 Pa.s at 25° C.

Silica contains, for example, a finely divided silica obtained from fumed silica, sedimented silica and silica aerosol. Silica having a surface area of from about 50 to 400 $m^2/g$ is preferred. Also preferred is silica treated with a liquid organosiloxane compound (hereinafter referred to as a "silica treating agent") having a silanol group or a group capable of being changed to a silanol group by hydrolysis. Examples of the silica treating agent are (a) a low molecular weight liquid polydiorganosiloxane, (b) a hexaorganodisiloxane and (c) a hexaorganodisilazane, which have a hydroxyl group or an alkoxy group as a terminal group. Of these silica treating agents, a polydimethylsiloxane oligomer having a hydroxyl end group and an average polymerization degree of from about 2 to 10 is preferred. Relating to silica used in combination with the polyorganosiloxane, it is recommendable to treat 100 parts by weight of silica with from 10 to 45 parts by weight of the silica treating agent before blending with the polyorganosiloxane. It is also recommendable to further treat the aforementioned powdery mixture of the polyorganosiloxane and silica with an alkoxysilane compound. As the alkoxysilane compound, those having at least one alkoxy group having 1 to 4 carbon atoms and at least one group selected from epoxy, amino, acryloxy, methacryloxy, vinyl and phenyl groups are exemplified.

In the case where the polyphenylene ether resin composition, particularly a thin molded product comprising said composition, is required to have superior tensile elongation and superior impact-resisting property, it is recommendable to use the polyorganosiloxane or a mixture thereof with silica as the dispersed substance.

The dispersed substance in the polyphenylene ether resin composition in accordance with the present invention has an aspect ratio of not less than about 2. When the aspect ratio is less than 2, the polyphenylene ether resin composition obtained may be inferior in its dripping phenomenon-inhibiting effect (anti-dripping effect). The larger the aspect ratio, the better the anti-dripping effect. However, an aspect ratio exceeding about 100 may cause a problem such that the appearance of the molded product obtained from the polyphenylene ether resin composition is deteriorated. Here, the term "aspect ratio" means t/d, wherein "t" stands for an average number of the longest distance between both (two) ends of the dispersed substance present in the polyphenylene ether resin composition (hereinafter referred to as "average of long diameter")and "d" stands for an average number of the shortest distance between both (two) ends thereof (hereinafter referred to as "average of short diameter").

The aspect ratio can be measured in a manner such that a molded product (for example, a sheet) obtained from the polyphenylene ether resin composition is cross-sectionally photographed by a scanning electron microscope or a transmission electron microscope, and 20 or more of particles (the dispersed substance) randomly extracted from the photograph are measured for their longest both ends distances and their shortest both ends distances, respectively, from which the respective averages of a long and short diameter are calculated to obtain the aspect ratio.

In the case where the polyphenylene ether resin composition is molded by a molding method wherein a tensile stress is applied to the free surface of the melted resin composition, namely, the resin composition is molded by, for example, an extrusion molding method with use of a T die, the "longest" both ends distance of the dispersed substance is preferably not more than 100 μm. When the distance exceeds 100 μm, there may be caused an unevenness on the surface of the molded product formed from the polyphenylene ether resin composition obtained, thereby deteriorating the appearance thereof. However, in the case where the resin composition is molded by a molding method such as injection molding, heat press molding and calendering, deterioration of the appearance hardly occurs even when the "longest" both ends distance exceeds 100 μm.

A content of the dispersed substance is preferably from about 0.2 to 20% by weight, more preferably from about 0.3 to 10% by weight, based on the total weight of the polyphenylene ether resin composition. When the content is too small, the polyphenylene ether resin composition obtained may be inferior in its anti-dripping effect, whereas, when it is too large, the polyphenylene ether resin composition obtained may be inferior in its mechanical properties such as impact resistance.

The above-mentioned respective components used in the present invention may be used in combination with other high molecular weight compounds or additives such as, for example, dyes, pigments, antistatic agents, anti-oxidants and weather resistance improving agents in a manner such that the objects and the effects of the present invention are not impaired.

Examples of said other high molecular weight compounds are styrene based polymers such as, for example, polystyrene, high impact polystyrene and styrene-butadiene-styrene triblock copolymer; olefinic polymers such as, for example, polypropylene, high density polyethylene, low density polyethylene, linear low density polyethylene, propylene-ethylene copolymer, ethylene-butene-1 copolymer, ethylene-pentene copolymer, ethylene-hexene copolymer and poly-4-methylpentene-1; copolymers of an olefin such as, for example, ethylene and propylene with a vinyl monomer such as, for example, acrylic acid esters containing, for example, methyl acrylate and ethyl acrylate, methacrylic acid esters containing, for example, methyl methacrylate and ethyl methacrylate, vinyl acetate, styrene, acrylonitrile and glycidyl (meth)acrylate; polymers such as, for example, polyvinyl chloride, polymethyl methacrylate, polyvinyl acetate, polyvinyl pyridine, polyvinyl carbazol, polyacrylamide and polyacrylonitrile; high molecular weight compounds such as, for example, polycarbonate, polysulfone, polyether sulfone, polyethylene terephthalate, polybutylene terephthalate, polyarylene esters containing, for example, U POLYMER (trademark) produced by Unitika Ltd., polyphenylene sulfide, polyamides containing, for example, 6-nylon, 6,6-nylon and 12-nylon, and polyacetal; thermosetting resins such as, for example, polyimide, polyamidimide, phenol resin, alkyd resin, unsaturated polyester resin and diallyl phthalate resin; silicone resins and fluorocarbon resins.

A process for producing the polyphenylene ether resin composition in accordance with the present invention is not particularly limited and may be any of those known in the art. The process contains, for example, a solution-blending process and a melt-kneading process. Of these, a melt-kneading process is recommendable. As the melt-kneading process, there is exemplified a process wherein respective components mentioned above are blended in an optional order in a mixer such as a Henschel mixer, a super-mixer, a ribbon blender and a V blender, and the resulting mixture is melt-kneaded in a kneader such as a Banbury mixer, a plastomill, a Brabender plastograph and a single or twin screw extruder. A melt-kneading temperature is usually from about 150 to 400° C., preferably from about 200 to 350° C.

A process for producing a molded product of the polyphenylene ether resin composition in accordance with the present invention is not particularly limited and may be any of those known in the art. Examples of the process for producing said molded product are an extrusion molding method, a calender molding method, an injection molding method and a blow molding method.

According to the present invention, there can be obtained a polyphenylene ether resin composition which comprises, a polyphenylene ether resin, a phosphoric ester and a dispersed substance having a specific size, and which is superior both in its heat-resisting property and its flame-resisting property. The resin composition comprises neither a halogen-containing flame retardant nor a halogen-containing anti-dripping agent as an essential or mandatory component.

The polyphenylene ether resin composition in accordance with the present invention is suitable for uses such as, for example, films, sheets, office automation instruments and electric and electronic instruments. Particularly, a thin molded product having a thickness of about 1 mm or less obtained from the present polyphenylene ether resin composition can be used suitably as sheets or films for electric and electronic parts. In particular, a thin molded product having a thickness of about 0.5 mm or less, a thermal deformation temperature of not lower than 80° C. and a flame resistance of V-0 is suitable as a flame-resisting insulation sheet for electric and electronic instruments.

EXAMPLE

The present invention is explained in more detail with reference to the following Examples, which are only illustrative, and are not limitative for the scope of the present invention.

Components used in Examples and Comparative Examples are as follows.

1. Polyphenylene Ether Resin

PPE: Poly(2,6-dimethyl-1,4-phenylene ether), its intrinsic viscosity measured in chloroform at 30° C. being 0.46 dl/g.

2. Block Copolymer (Other High Molecular Weight Compound)

SBS: Styrene-butadiene-styrene triblock copolymer, a trade mark of CARIFLEX TR1101, produced by Shell Chemical Company.

3. Phosphoric Ester

P-1: Triphenyl phosphate, produced by Daihachi Chemical Industry Company.

P-2: Resorcinol bisdiphenyl phosphate, a trade mark of CR733S, produced by Daihachi Chemical Industry Company, its phosphorus content being 10.7% by weight, which corresponds to a compound represented by the formula (II), wherein $R_6$, $R_7$, $R_8$ and $R_9$=phenyl, p=1, q=1 and r=1.

4. Dispersed Substance

Xonohige: Inorganic filler having a chemical formula of $6CaO.6SiO.H_2O$, produced by Ube Materials Company.

Wollastoniote: Inorganic filler produced by Hayashi Kazsei co. Ltd

GF: Glass fiber, a trademark of TP35, produced by Nippon Sheet Glass Co., Ltd.

LCP: Liquid crystal polymer, a trade mark of RODRUN LC5000, produced by Unitika Ltd.

SIP: Mixture comprising epoxy group-containing alkoxysilane, silica and polydiorganosiloxane, a trade mark of DC4-7051, produced by Dow Corning Asia Evaluation methods of the physical properties are as follows.

1. Thermal Deformation Temperature

The thermal deformation temperature used as a measure for heat resistance was measured under a load of 1.81 MPa according to ASTM D648.

2. Tensile Elongation

The tensile elongation was measured at 23° C. according to ASTM D638.

3. Izod Impact Strength

A notched Izod impact strength was measured at 23° C. according to ASTM D256.

4. Flame Resistance

The polyphenylene ether resin composition was press molded to obtain respective test pieces of 0.4 mm and 0.3 mm in thickness. Using the test pieces obtained, the UL 94 vertical combustion test was carried out. In the evaluation of the flame resistance, the term "not coming under" means that the burning period of time is more than that prescribed under the UL-94 vertical combustion test, or that the test piece burns to a clump, and the term also expresses an evaluation that is inferior to V-0, V-1 and V-2.

5. Appearance

The polyphenylene ether resin composition was molded with a single screw extruder having a screw diameter of 30 mm to obtain a sheet having a thickness of 0.3 mm. The sheet was visually evaluated on the basis of the following criteria.

Good: No appearance deficiency was observed.
Bad: Appearance deficiency was observed.

6. Aspect Ratio (1) With respect to the aspect ratio relating to the dispersed substance of inorganic fillers, a molded product having a thickness of 0.3 mm obtained by press-molding the polyphenylene ether resin composition was cross-sectionally photographed by a scanning electron microscope. Not less than 20 of the dispersed particles were extracted randomly from the photograph, and their longest both ends distances and shortest both ends distances were measured to calculate the aspect ratio, i.e. a ratio of respective average values=average value of the longest both ends distances/average value of the shortest both ends distances.

(2) With respect to the aspect ratio relating to the dispersed substance of liquid crystal polymers, an ultra-thin slice obtained by cutting a press-molded product of the polyphenylene ether resin composition with a microtome was dyed with osmium tetroxide, and then photographed by a transmission electron microscope. Not less than 20 of the dispersed particles were extracted randomly from the photograph, and their longest both ends distances and shortest both ends distances were measured to calculate the aspect ratio, i.e. a ratio of respective average values=average value of the longest both ends distances/average value of the shortest both ends distances.

(3) With respect to the aspect ratio relating to the dispersed substance of silicone compounds, an ultra-thin slice obtained by cutting a press-molded product of the polyphenylene ether resin composition with a microtome (not dyed) was photographed by a transmission electron microscope. Not less than 20 of the dispersed particles were extracted randomly from the photograph, and their longest both ends distances and shortest both ends distances were measured to calculate the aspect ratio, i.e. a ratio of respective average values=average value of the longest both ends distances/average value of the shortest both ends distances.

Example 1

Respective components in their blending proportions (parts by weight) as shown in Table 1 were fed from a hopper of a twin screw kneading machine (TEM-50A manufactured by Toshiba Machine Co.) set at a cylinder temperature of 260° C. and a screw rotation of 200 rpm and melt-kneaded to obtain respective resin compositions in the form of pellets. The pellets were press-molded to obtain test pieces of 0.4 mm and 0.3 mm in thickness, respectively. Evaluation results of these test pieces are as shown in Table 1.

The foregoing pellets were extruded through a single screw extruder having a screw diameter of 30 mm with a T die of a 0.5 mm wide lip at an extrusion temperature of 260° C., thereby obtaining a sheet having a thickness of 0.3 mm. The appearance thereof was evaluated.

Examples 2 to 6 and Comparative Examples 1 and 2

Example 1 was repeated, except that respective components in their blending proportions (parts by weight) as shown in Tables 1 and 2 were used. Evaluation results are as shown in Tables 1 and 2. Here, in Comparative Examples 1 and 2, no dispersed substance was used, such that the dripping phenomenon was observed on three test pieces of Comparative Example 1 (out of 5 five pieces thereof tested) and two test pieces of Comparative Example 2 (out of 5 five pieces thereof tested), respectively.

TABLE 1

| Example | 1 | 2 | 3 | 4 | 5 | 6 |
|---|---|---|---|---|---|---|
| Blending proportion (parts by weight) | | | | | | |
| PPF | 100 | 100 | 100 | 100 | 100 | 100 |
| P-1 | 22 | 22 | 22 | 22 | 22 | 6 |
| P-2 | 0 | 0 | 0 | 0 | 0 | 15 |
| Xonohize | 3 | 0 | 0 | 0 | 0 | 3 |
| wollastonite | 0 | 3 | 0 | 0 | 0 | 0 |
| GF | 0 | 0 | 3 | 0 | 0 | 0 |
| LCP | 0 | 0 | 0 | 3 | 0 | 0 |
| SIP | 0 | 0 | 0 | 0 | 6 | 0 |
| SBS | 14 | 14 | 14 | 14 | 14 | 2.5 |
| Average of long diameter (micron m) | 1.5 | 30 | 280 | 2 | 0.3 | 1.5 |
| Average of short diameter (micron m) | 0.1 | 5 | 10 | 0.6 | 0.1 | 0.1 |
| Aspect ratio | 15 | 6 | 28 | 3.3 | 3 | 15 |
| Thermal Deformation temperature (Celsius) | 95 | 95 | 96 | 94 | 94 | 111 |
| Tensile elongation (%) | 35 | 35 | 60 | 27 | 110 | 60 |
| Izod impact Strength (kJ/m$^2$) | 22 | 12 | 16 | 19 | 50 | 3 |
| Flame resistance | | | | | | |
| 0.4 mm Thickness | V-0 | V-0 | V-0 | V-0 | V-0 | V-0 |
| 0.3 mm Thickness | V-0 | V-0 | V-0 | V-0 | V-0 | V-0 |
| Appearance of sheet | Good | Good | Bad | Good | Good | Good |

TABLE 2

| Comparative Example | 1 | 2 |
|---|---|---|
| Blending proportion (parts by weight) | | |
| PPE | 100 | 100 |
| P-1 | 22 | 6 |
| P-2 | 0 | 15 |
| Xonohize | 0 | 0 |
| wollastonite | 0 | 0 |
| GF | 0 | 0 |
| LCP | 0 | 0 |
| SIP | 0 | 0 |
| SBS | 14 | 2.5 |
| Average of long diameter (micron m) | — | — |
| Average of short diameter (micron m) | — | — |
| Aspect ratio | — | — |
| Thermal deformation temperature (Celsius) | 92 | 109 |
| Tensile elongation (%) | 70 | 16 |
| Izod impact strength (kJ/m$^2$) | 42 | 3 |
| Flame resistance | | |
| 0.4 mm Thickness | V-2 | — |
| 0.3 mm Thickness | NCU | V-2 |
| Appearance of sheet | Good | — |

Note: In Table 2, "NCU" stands for "not coming under"; meaning that the burning period of time is more than that prescribed under the UL-94 vertical combustion test, or that the test piece burns to a clump, and the term also expresses an evaluation that is inferior to V-0, V-1 and V-2.

What is claimed is:

1. A polyphenylene ether resin composition comprising:
   (i) a polyphenylene ether resin
   (ii) a phosphoric ester and
   (iii) a dispersed substance having an aspect ratio of not less than about 2, wherein the dispersed substance contains a polyorganosiloxane and silica.

2. The polyphenylene ether resin composition according to claim 1, wherein the phosphoric ester is present in a content of from about 1 to 70 parts by weight based on 100 parts by weight of the polyphenylene ether resin, and the dispersed substance is present in a content of from about 0.2 to 20% by weight based on the total weight of the polyphenylene ether resin composition.

3. The polyphenylene ether resin composition according to claim 1, wherein the phosphoric ester contains tritolyl phosphate triphenyl phosphate, bisphenol A bisdiphenyl phosphate, bisphenol A bisdixylyl phosphate, resorcinol bisdiphenyl phosphate or resorcinol bisdixylyl phosphate.

4. A flame-resisting insulation sheet comprising a polyphenylene ether resin composition, which resin composition contains:
   (i) a polyphenylene ether resin
   (ii) a phosphoric ester and
   (iii) a dispersed substance having an aspect ratio of not less than about 2, wherein the dispersed substance contains a polyorganosiloxane and silica.

5. The flame-resisting insulation sheet according to claim 4, wherein the sheet has a thickness of not more than 0.5 mm.

* * * * *